(12) United States Patent
Sugisaka et al.

(10) Patent No.: US 8,722,177 B2
(45) Date of Patent: May 13, 2014

(54) TRANSFER MOLD BODY

(71) Applicant: Kabushiki Kaisha Tokai-Rika-Denki-Seisakusho, Aichi-ken (JP)

(72) Inventors: Kenichi Sugisaka, Aichi-ken (JP); Takashi Ichikawa, Aichi-ken (JP); Eiji Yamada, Aichi-ken (JP); Atsushi Tsukihara, Aichi-ken (JP); Ryusuke Sadamatsu, Aichi-ken (JP); Katsuyuki Imaeda, Aichi-ken (JP); Soichiro Ogawa, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 13/868,400

(22) Filed: Apr. 23, 2013

(65) Prior Publication Data

US 2013/0288020 A1    Oct. 31, 2013

(30) Foreign Application Priority Data

Apr. 25, 2012    (JP) .................................. 2012-099958

(51) Int. Cl.
   *B32B 3/10*    (2006.01)

(52) U.S. Cl.
   USPC ........................................ 428/195.1; 264/255

(58) Field of Classification Search
   CPC ........................................................ B32B 3/10
   USPC ........................................ 428/195.1; 264/255
   See application file for complete search history.

(56) References Cited

FOREIGN PATENT DOCUMENTS

JP            06-015945 A      1/1994

*Primary Examiner* — Bruce H Hess
(74) *Attorney, Agent, or Firm* — Roberts Mlotkowski Safran & Cole P.C.

(57) ABSTRACT

In a transfer mold body, a display portion is formed from a crystalline resin and a main body portion is formed from an amorphous resin. Accordingly, a transfer layer is only transferred to the amorphous resin formed main body portion that has good transfer properties for the transfer layer, and the transfer layer is not transferred to the crystalline resin formed display portion that has poor transfer properties for the transfer layer. Accordingly, only the main body portion is decorated by the transfer layer, with the display portion to which the transfer layer is not transferred visibly displayed as the letter. Accordingly, since printing process is not necessary, suppressing an increase in cost of the transfer mold body. Moreover, the position of the letter is determined by two-color molding of the main body portion and the display portion, enabling positional displacement of the letter to be suppressed.

13 Claims, 6 Drawing Sheets

TRANSFER MOLD BODY

CROSS-REFERENCE TO RELATED APPLICATION

This application claims priority under 35 USC 119 from Japanese Patent Application No. 2012-099958 filed Apr. 25, 2012, the disclosure of which is incorporated by reference herein.

BACKGROUND OF THE INVENTION

1. Field of the Invention

The present invention relates to a transfer mold body that includes a transfer layer.

2. Related Art

Japanese Patent Application Laid-Open (JP-A) No. 06-15945 discloses a transfer method in which a transfer layer is transferred to a boy to be transferred (transfer mold body). More specifically, a transfer member including a transfer layer and a base film is disposed facing the body to be transferred, and the base film is separated from the transfer layer after applying heat and pressure to the transfer member, thereby transferring the transfer layer to the body to be transferred.

In a case of displaying lettering or the like on such body to be transferred, the lettering or the like is for example printed (for example by pad printing) on the body to be transferred onto which the transfer layer is transferred.

However, when printing lettering or the like on the body to be transferred by using for example pad printing, the printed letter may sometimes displace from the set position of the letter on the body to be transferred. Moreover, a process for printing lettering or the like on the body to be transferred is a post-process subsequent to transferring the transfer layer onto the body to be transferred, with the issue that incurs an increase in costs of the body to be transferred.

SUMMARY OF THE INVENTION

In consideration of the above circumstances, the present invention is to provide a transfer mold body, capable of suppressing an increase in cost and also capable of suppressing positional displacement, that displays lettering or the like.

A transfer mold body of a first aspect of the invention includes a base member that includes a first mold portion molded with a crystalline resin and a second mold portion molded with an amorphous resin; and a transfer layer that is formed on the second mold portion.

In the transfer mold body of the first aspect, the base member is configured including the first mold portion and the second mold portion. The first mold portion is molded from a crystalline resin and the second mold portion is molded from an amorphous resin. Accordingly, when the transfer layer is transferred onto the base member, for example using a transfer sheet including the transfer layer, the transfer layer is transferred (adhered) to the amorphous resin formed second mold portion that has good transfer properties (adhesiveness) with respect to the transfer layer, and the transfer layer is not transferred (adhered) to the crystalline resin formed first mold portion that has poor transfer properties (poor adhesiveness) with respect to the transfer layer.

Namely, it is possible that transfer properties of the transfer layer to the crystalline resin are lower than transfer properties of the transfer layer to the amorphous resin (adhesive properties of the transfer layer to the crystalline resin are lower than adhesive properties of the transfer layer to the amorphous resin).

Further, it is possible that the transfer layer is a layer in which the transfer layer is not transferred onto the crystalline resin and the transfer layer is transferred onto the amorphous resin as a result of a predetermined condition being implemented (the transfer layer is a layer in which the transfer layer is not adhered to the crystalline resin and the transfer layer is adhered to the amorphous resin as a result of the predetermined condition being implemented).

Accordingly, lettering or the like can be displayed on the transfer mold body by expressing the lettering or the like with the first mold portion or the second mold portion, without relying on for example printing. Moreover, positional displacement of the lettering or the like can be suppressed since the position of the lettering or the like is determined by molding of the first mold portion and the second mold portion.

A transfer mold body of a second aspect of the present invention is the transfer mold body of the first aspect wherein the first mold portion and the second mold portion are integrally molded by two-color molding.

In the transfer mold body of the second aspect, the transfer mold body can be manufactured at low cost since the first mold portion and the second mold portion are integrally molded by two-color molding.

A transfer mold body of a third aspect of the present invention is the transfer mold body of the first aspect wherein the first mold portion and the second mold portion are configured as separate portions.

In the transfer mold body of the third aspect, since the first mold portion and the second mold portion are configured as separate portions (bodies), the both portions can be formed into a single body by for example fitting together the first mold portion and the second mold portion after the first mold portion and the second mold portion have been respectively formed. Molds for manufacturing the first mold portion and the second mold portion can accordingly be configured more simply than a case of integrally molding the first mold portion and the second mold portion by two-color molding.

Moreover, by for example forming the first mold portion in a plate shape and forming the first mold portion and the second mold portion into a single body by affixing the first mold portion to the second mold portion, the second mold portion can be configured as a common member for various specifications, for example. Namely, for example, the first mold portion, in which lettering or the like is expressed, is formed according to each specification, and the first mold portion is affixed to the second mold portion as a common member for various specifications, so each specification can be handled.

A transfer mold body of a fourth aspect of the present invention is the transfer mold body of any one of the first aspect to the third aspect wherein the first mold portion is molded with a crystalline resin having light transmitting properties.

A transfer mold body of a fifth aspect of the present invention is the transfer mold body of any one of the first aspect to the fourth aspect wherein at least one of a letter, a marking or a symbol is formed by the first mold portion.

In the transfer mold body of the fourth aspect and the fifth aspect, illuminated lettering, markings, symbols or the like can be displayed on the transfer mold body by for example disposing a light emitting device at the back side of the first mold portion.

According to the transfer mold body of the first aspect, an increase in cost can be suppressed and lettering or the like can be displayed with positional displacement the lettering or the like suppressed.

According to the transfer mold body of the second aspect an increase in cost of the transfer mold body can be further suppressed.

According to the transfer mold body of the third aspect, molds for manufacturing the first mold portion and the second mold portion can be configured simply, and for example the second mold portion can be configured as a common member for various specifications.

According to the transfer mold body of the fourth aspect and the fifth aspect, for example illuminated lettering, markings, symbols or the like can be displayed.

BRIEF DESCRIPTION OF THE DRAWINGS

Exemplary embodiments of the invention will be described in detail with reference to the following figures, wherein.

DETAILED DESCRIPTION OF THE INVENTION

Explanation first follows regarding a transfer mold body 10 according to an exemplary embodiment of the present invention, followed by explanation regarding a transfer apparatus 30 for manufacturing the transfer mold body 10.

Regarding the Transfer Mold body 10

Figure 1:
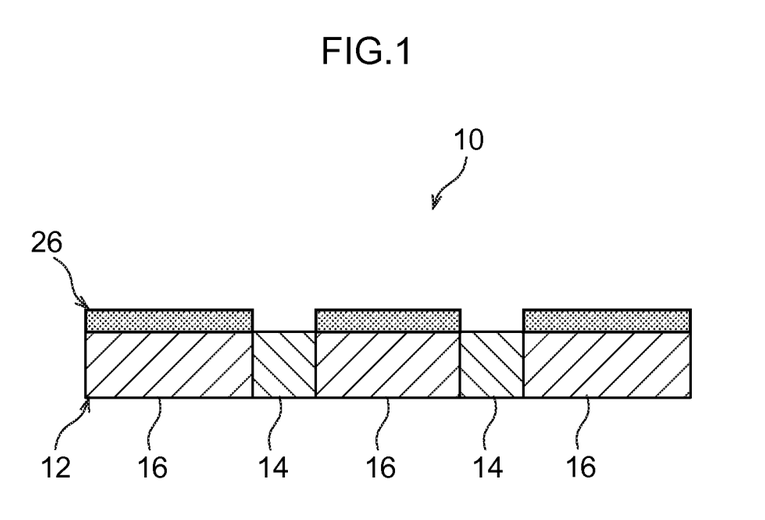
FIG. 1 is an enlarged cross-section (a cross-section along line 1-1 in FIG. 2) illustrating a portion of a transfer mold body according to an exemplary embodiment of the present invention.
Figure 2:
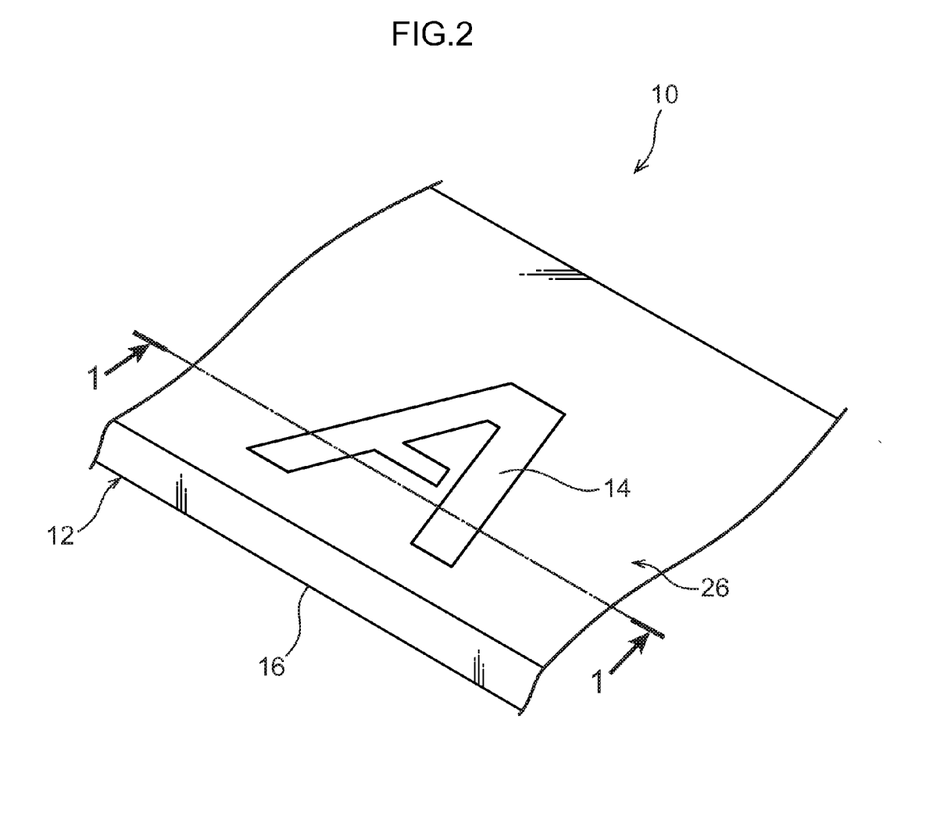
FIG. 2 is a cut-away perspective view illustrating a portion of a transfer mold body according to an exemplary embodiment of the present invention.

FIG. 1 is an enlarged cross-section illustrating a portion of the transfer mold body 10. FIG. 2 is a cut-away perspective view illustrating a portion of the transfer mold body 10. The transfer mold body 10 is for example applied to an interior member of a vehicle (such as a design panel affixed to an instrument panel, a grille of an vehicle mounted navigation device or a vehicle mounted audio device, a panel of a vehicle installed heater controller, or a panel assembled to a vehicle shift lever case).

The transfer mold body 10 is configured including a base member 12 and a transfer layer 26. The base member 12 is configured including a display portion 14 serving as a "first mold portion" and a main body portion 16 serving as a "second mold portion".

The main body portion 16 is molded (formed) from an amorphous resin (for example ABS or the like) and is formed in a substantially plate shape. The display portion 14 is molded (formed) from a crystalline resin (for example POM or the like) and is formed to a portion of the main body portion 16. The main body portion 16 and the display portion 14 are integrally molded by two-color molding. The display portion 14 is formed in the shape of for example a letter, a marking or a symbol (the letter "A" in the present exemplary embodiment).

The transfer layer 26 is formed at the surface of the main body portion 16, and is not formed at the surface of the display portion 14. The display portion 14 is accordingly exposed in the transfer mold body 10, with the letter "A" visibly displayed.

Figure 3:
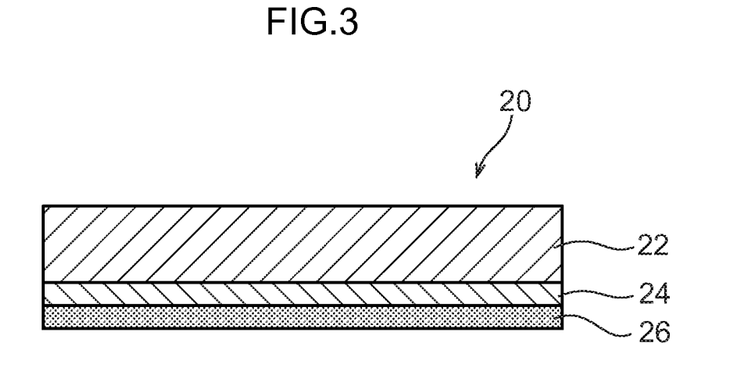
FIG. 3 is an enlarged cross-section illustrating a transfer film employed in the transfer mold body illustrated in FIG. 1.

The transfer layer 26 is formed to the surface of the main body portion 16 by the transfer apparatus 30, described later, using a transfer film 20 illustrated in FIG. 3. As shown in FIG. 3, the transfer film 20 is configured including a film substrate 22, a release layer 24 and the transfer layer (ink layer) 26. The release layer 24 and the transfer layer 26 are layered in sequence on the film substrate 22. In the transfer layer 26, a transfer pattern such as a wood-grain pattern is drawn by for example gravure printing. The transfer layer 26 is adhered to the main body portion 16 by heating to a specific temperature or higher thereafter the transfer layer 26 is cooled. The release layer 24 is formed from for example a silicone resin, so as to adjust the release force of the transfer layer 26 from the film substrate 22.

Regarding the Transfer Apparatus 30

Figure 4:
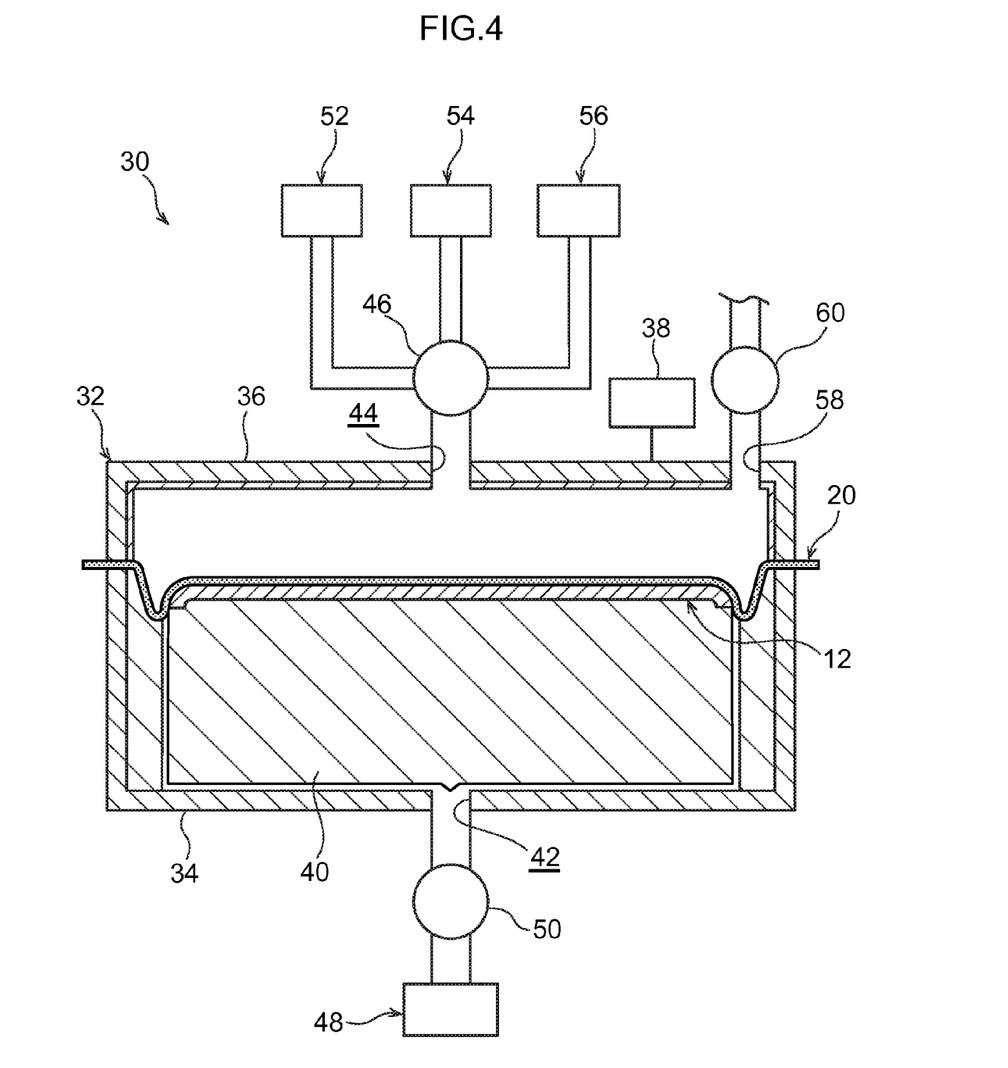
FIG. 4 is a schematic cross-section illustrating a transfer apparatus for transferring a transfer layer to the base illustrated in FIG. 1.

As shown in FIG. 4, the transfer apparatus 30 is configured including a transfer mold 32, a vacuum pump 48, a vapor generator (vapor generating device) 52, a cooling device 54, and a pressurizer (pressing device) 56.

The transfer mold 32 is configured including a fixed mold 34 that configures a lower portion of the transfer mold 32 and a movable mold 36 that configures an upper portion of the transfer mold 32. The transfer mold 32 is formed in the shape of a substantially rectangular parallelopiped container. The fixed mold 34 and the movable mold 36 are disposed facing each other, with the movable mold 36 coupled to a mold clamp device 38 and configured movable in an up-down direction by the mold clamp device 38. Configuration is thus such that the interior of the transfer mold 32 can be opened up by moving the movable mold 36 upwards using the mold clamp device 38.

A setting platform 40 is fixed inside the fixed mold 34, and configuration is such that the base member 12 of the transfer mold body 10 is fixed to the setting platform 40 with the interior of the transfer mold 32 in an open state. Moreover, a lower wall of the fixed mold 34 is formed with an air removal hole (air exhaust hole) 42. The air removal hole 42 passes through (penetrates) inside the setting platform 40 and extends to edge portion of the base member 12. An upper wall of the movable mold 36 is formed with an blowing hole (jetting hole) 44. A valve 46 is in communication with the blowing hole 44.

The vacuum pump 48 is in communication with the air removal hole 42 through a valve 50. The vacuum pump 48 is configured so as to remove air from between the base member 12 and the transfer film 20.

The vapor generator 52 is in communication with the blowing hole 44 through the valve 46. The vapor generator 52 generates for example saturated water vapor at atmospheric pressure (atmospheric pressure saturated water vapor), with configuration made such that the saturated vapor passes through the valve 46 and is blown (supplied) from the blowing hole 44.

The cooling device 54 and the pressurizer 56, described later, are also in communication with the blowing hole 44 through the valve 46. Configuration is made such that the blowing hole 44 can be switched between communication with one of the vapor generator 52, the cooling device 54 and the pressurizer 56 by using the valve 46.

The cooling device 54 is in communication with the blowing hole 44 through the valve 46. Configuration is made such that cool air is supplied into the transfer mold 32 from the blowing hole 44 by the cooling device 54 when the blowing hole 44 has been placed in communication with the cooling device 54 by the valve 46.

The pressurizer 56 is in communication with the blowing hole 44 through the valve 46. Configuration is made such that compressed air is supplied into the transfer mold 32 from the blowing hole 44 by the pressurizer 56 when the blowing hole 44 has been placed in communication with the pressurizer 56 by the valve 46.

The upper wall of the movable mold 36 is further formed with a discharge hole 58, and with a valve 60 connected to the discharge hole 58. Configuration is made such that the temperature of the compressed air and saturated vapor becomes lower when the valve 60 is opened, and liquid (drain) into which the saturated vapor has changed is drained from the movable mold 36 through the discharge hole 58 and the valve 60.

Explanation now follows regarding operation and advantageous effects of the present exemplary embodiment, whilst explaining a procedure for transferring (a transfer method of) the transfer layer 26 onto the base member 12 using the transfer apparatus 30.

Firstly, the movable mold 36 is moved upwards by the mold clamp device 38, opening up the interior of the transfer mold 32. The base member 12 is then fixed to the setting platform 40 and the transfer film 20 is disposed on the movable mold 36 side of the base member 12. The movable mold 36 is then moved downwards by the mold clamp device 38, thereby closing off the interior of the transfer mold 32.

Next, air between the base member 12 and the transfer film 20 is removed (exhausted) by using the vacuum pump 48, so the pressure of the air between the base member 12 and the transfer film 20 is lowered, and the transfer film 20 is pressed by the pressure of the air inside the transfer mold 32. The transfer film 20 is accordingly covered over the surface of the base member 12 (covering process).

In this state, the vapor generator 52 generates saturated vapor at atmospheric pressure, and this saturated vapor is supplied into the transfer mold 32 through the blowing hole 44. The transfer film 20 is accordingly heated to a specific temperature or above (heating process). Compressed air is then supplied into the transfer mold 32 by the pressurizer 56, tightly contacting the transfer film 20 (transfer layer 26) on the surface of the base member 12 (pressurization process).

Next, cool air is supplied into the transfer mold 32 by the cooling device 54 through the blowing hole 44, thereby cooling the transfer film 20 and adhering the transfer layer 26 to the surface of the base member 12 (cooling process). The interior of the transfer mold 32 is opened up by moving the movable mold 36 upwards by using the mold clamp device 38.

Note that the base member 12 is configured including the display portion 14 and the main body portion 16. The display portion 14 is molded with a crystalline resin, and the main body portion 16 is molded with an amorphous resin. Therefore, as shown in FIG. 1, when the film substrate 22 of the transfer film 20 is removed (peeled) from the transfer mold body 10, the release layer 24 together with the film substrate 22 peel away from the transfer layer 26 that has adhered to the surface of the main body portion 16, with the transfer layer 26 remaining on the surface of the main body portion 16. However, the transfer layer 26 that is disposed on the display portion 14 is peeled away from the display portion 14 together with the release layer 24 (peeling process). Namely, the transfer layer 26 is only transferred (adhered) to the amorphous resin formed main body portion 16 that has good (high) transfer properties (adhesiveness) with respect to the transfer layer 26 whilst the transfer layer 26 is not transferred (adhered) to the crystalline resin formed display portion 14 that has poor (low) transfer properties (poor adhesiveness) with respect to the transfer layer 26 by the above mentioned predetermined conditions being subject thereto. Accordingly, only the surface of the main body portion 16 is decorated by the transfer layer 26, with the display portion 14 to which the transfer layer 26 is not transferred accordingly visibly displayed as the letter "A".

The transfer mold body 10 can accordingly suppress an increase in costs since a letter and the like can be expressed on the transfer mold body 10 without the need for subsequent processing such as printing after the transfer layer 26 has been transferred onto the base member 12. Moreover, the position of the letter "A" displayed on the display portion 14 is determined by the two-color molding of the main body portion 16 and the display portion 14, thereby allowing positional displacement of the letter A to be suppressed.

Moreover, as explained above, since the display portion 14 and the main body portion 16 of the base member 12 are integrally molded by the two-color molding, the base member 12 can be manufactured at low cost. An increase in cost of the transfer mold body 10 can accordingly be further suppressed.

Figure 5A:
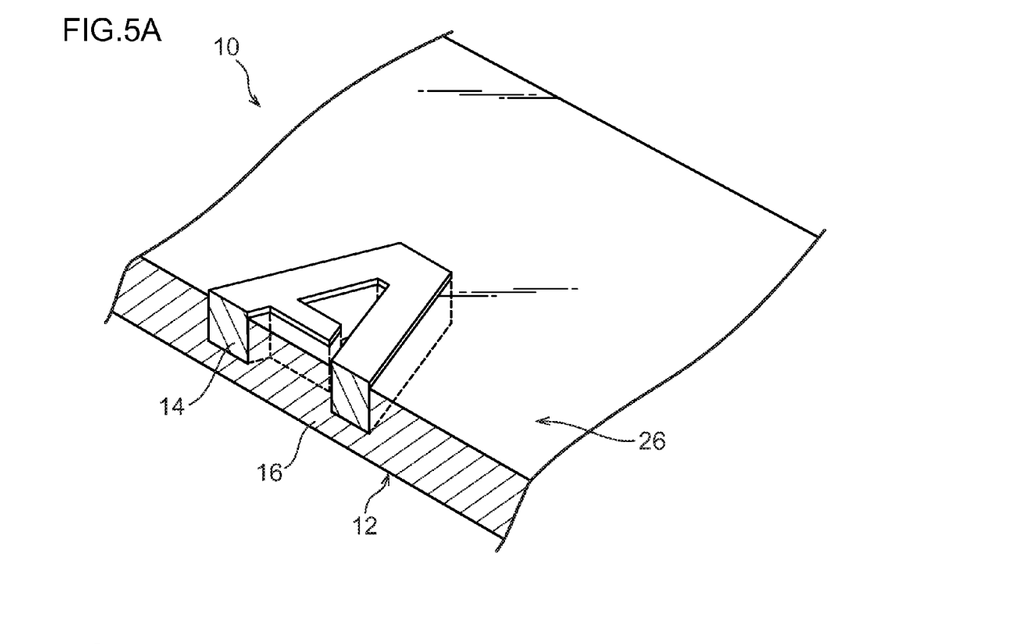
FIG. 5A is a perspective view illustrating a state in which a main body portion and a display portion illustrated in FIG. 1 are configured as separate bodies, and the display portion has been fitted together with the main body portion from the front side of the main body portion.
Figure 5B:
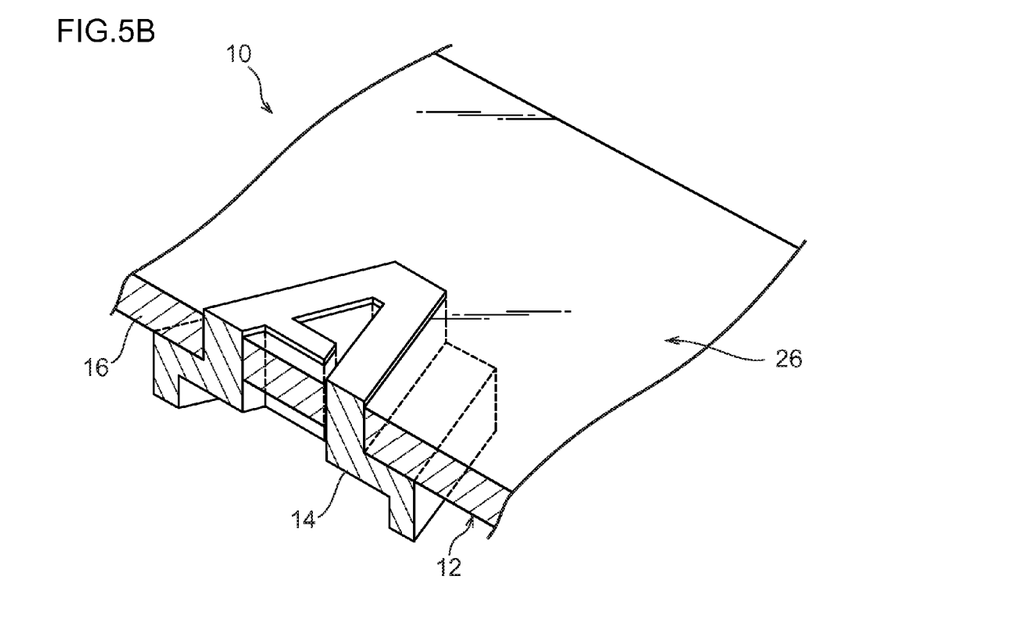
FIG. 5B is a perspective view illustrating a state in which a main body portion and a display portion are configured as separate bodies and the display portion has been fitted together with the main body portion from the back side of the main body portion.
Figure 6:
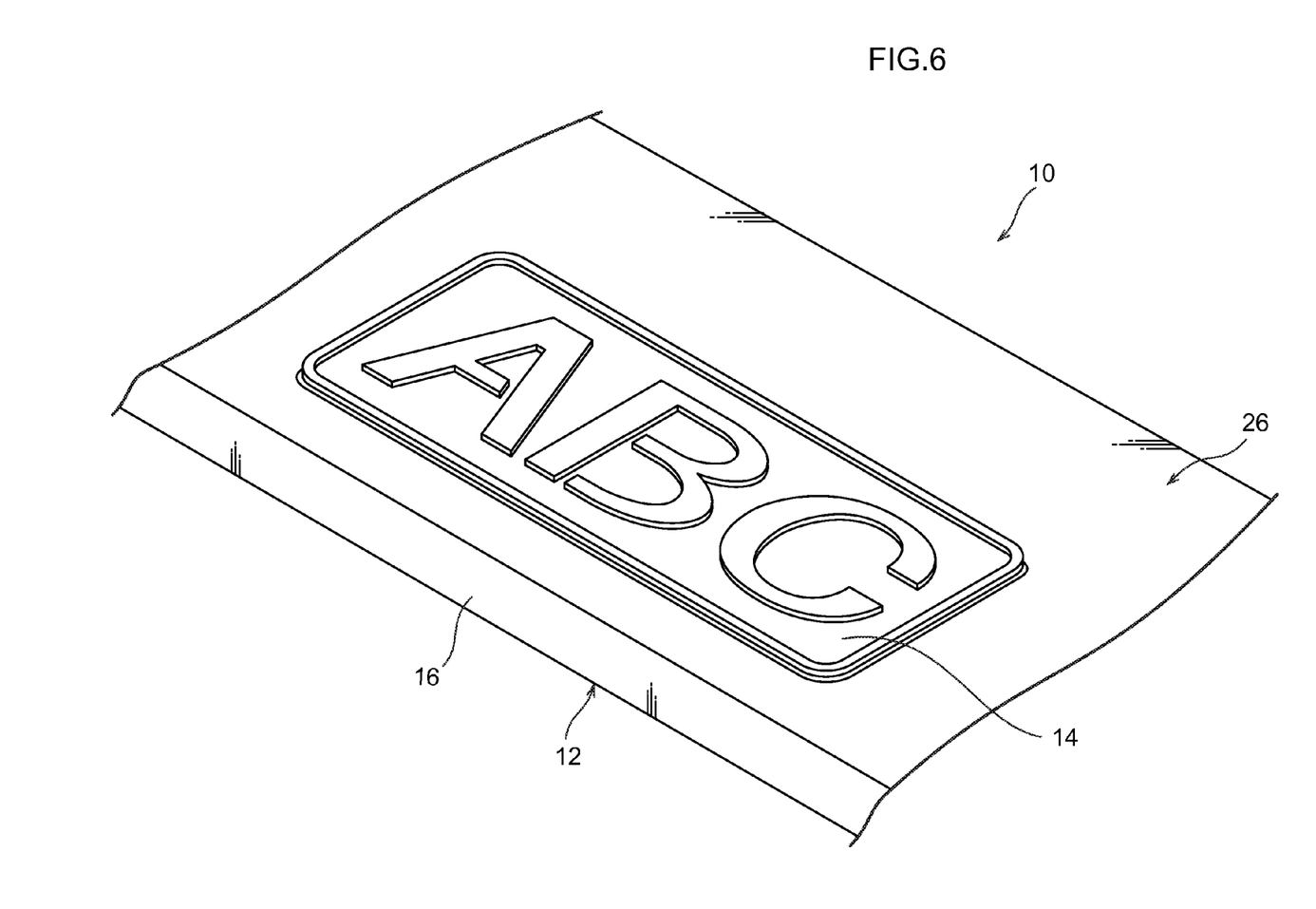
FIG. 6 is a perspective view illustrating a state in which a main body portion and a display portion illustrated in FIG. 1 are configured as separate bodies and the display portion has been fitted together with the main body portion from the front side of the main body portion.

Note that in the present exemplary embodiment, the main body portion 16 and the display portion 14 are integrally molded using two-color molding. As shown in FIG. 5A, FIG. 5B and FIG. 6, configuration can alternatively be made wherein the main body portion 16 and the display portion 14 are molded as separate bodies and then integrally formed by fitting together the main body portion 16 and the display portion 14.

For example, as illustrated in FIG. 5A, configuration can be made wherein a recessed portion in the shape of a letter "A" is formed in the main body portion 16 and the display portion 14, that is formed in the shape of a letter "A", fitted together with the main body portion 16 by inserting the display portion 14 into the recessed portion from the front side of the main body portion 16. Moreover, as shown in FIG. 5B, a hole formed in the shape of a letter "A" can be formed to the main body portion 16, and the display portion 14, that is formed in the shape of the letter "A", fitted together with the main body portion 16 by inserting the display portion 14 into the hole from the back side of the main body portion 16.

Moreover, as shown in FIG. 6, for example a recessed portion of rectangular cross-section can be formed in the main body portion 16, and the display portion 14 formed with a plate shape, the display portion 14 is inserted into and affixed to the recessed portion from the front face side of the main body portion 16. Due thereto, it is possible that the main body portion 16 is configured as a common member for various specifications, and the display portion 14, in which for example lettering such as "ABC" is expressed (formed and shown), is formed and is affixed to the main body portion 16. Accordingly, various specification can be handled.

In the present exemplary embodiment, the display portion 14 is molded from a crystalline resin, and the main body portion 16 is molded from an amorphous resin. Configuration may alternatively be made wherein the display portion 14 is molded from an amorphous resin and the main body portion 16 is molded from a crystalline resin. In this case, the transfer layer 26 is only transferred to the display portion 14, with the display portion 14 displayed as the letter "A" on the transfer mold body 10.

In the present exemplary embodiment, the display portion 14 is molded from a crystalline resin, in addition thereto, it is possible that the display portion 14 shown in figures is molded from a crystalline resin with light transmission properties. Display can be made such that the letter "A" is illuminated at the display portion 14 of the transfer mold body 10 by providing a light emitting device at the back face of the transfer mold body 10.

Moreover, in the present exemplary embodiment, the transfer layer 26 of the transfer film 20 is transferred onto the base member 12 by lowering the pressure of air between the base member 12 and the transfer film 20 and performing the others with using the transfer apparatus 30, however the method for transferring the transfer layer 26 onto the base member 12 is not limited thereto. For example, the transfer film 20 can be floated in a water tank and the transfer layer 26 is transferred to the base member 12 by water pressure (in what is referred to as a "water pressure transfer method").

What is claimed is:

1. A transfer mold body comprising:
   a base member that includes a first mold portion molded with a crystalline resin and a second mold portion molded with an amorphous resin, the base member including a surface onto which a transfer layer is to be contacted;
   wherein the surface includes a first surface of the first mold portion and a second surface of the second mold portion, and the transfer layer is formed on the second surface of the mold portion.

2. The transfer mold body of claim 1, wherein the first mold portion and the second mold portion are integrally molded by two-color molding.

3. The transfer mold body of claim 1, wherein the first mold portion and the second mold portion are configured as separate portions.

4. The transfer mold body of claim 1, wherein the first mold portion is molded with a crystalline resin having light transmitting properties.

5. The transfer mold body of claim 4, wherein at least one of a letter, a marking or a symbol is formed by the first mold portion.

6. The transfer mold body of claim 1, wherein at least one of a letter, a marking or a symbol is formed by the first mold portion.

7. The transfer molded body of claim 1, wherein transfer properties of the transfer layer to the crystalline resin are lower than transfer properties of the transfer layer to the amorphous resin.

8. The transfer molded body of claim 7, wherein adhesive properties of the transfer layer to the crystalline resin are lower than adhesive properties of the transfer layer to the amorphous resin.

9. The transfer molded body of claim 1, wherein the transfer layer is a layer in which the transfer layer is not transferred onto the crystalline resin and the transfer layer is transferred onto the amorphous resin as a result of a predetermined condition being implemented.

10. The transfer molded body of claim 9, wherein the transfer layer is a layer in which the transfer layer is not adhered to the crystalline resin and the transfer layer is adhered to the amorphous resin as a result of the predetermined condition being implemented.

11. The transfer molded body of claim 1, wherein a shape of a letter, a marking or symbol which is displayed on the surface of the base member corresponds to a shape of the first mold portion or a shape of the second mold portion.

12. The transfer molded body of claim 1, wherein the transfer layer is formed only on the second surface of the first mold portion.

13. The transfer molded body of claim 1, wherein the first mold portion molded with a crystalline resin and the second mold portion molded with an amorphous resin are coplanar.

* * * * *